(12) United States Patent
Shinoda et al.

(10) Patent No.: US 10,766,062 B2
(45) Date of Patent: Sep. 8, 2020

(54) SERVOMOTOR CONTROL DEVICE IN PROCESSING MACHINE

(71) Applicant: FANUC CORPORATION, Minamitsuru-gun, Yamanashi (JP)

(72) Inventors: Shougo Shinoda, Yamanashi (JP); Tsutomu Nakamura, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 0 days.

(21) Appl. No.: 16/213,342

(22) Filed: Dec. 7, 2018

(65) Prior Publication Data

US 2019/0193139 A1 Jun. 27, 2019

(30) Foreign Application Priority Data

Dec. 22, 2017 (JP) ................. 2017-246725

(51) Int. Cl.
*G06F 19/00* (2018.01)
*B21J 15/28* (2006.01)
*G05B 19/19* (2006.01)

(52) U.S. Cl.
CPC ............ *B21J 15/285* (2013.01); *G05B 19/19* (2013.01); *G05B 2219/45126* (2013.01)

(58) Field of Classification Search
CPC .................... B21D 24/02; G05B 19/19; G05B 2219/42087; G05B 19/416; G05B 2219/37399; G05B 2219/41177; G05B 2219/42123; G05B 2219/42129; G05B 2219/42336; G05B 2219/45143; G05B 2219/45244; G05B 5/01; B29C 45/76; B29C 45/77; B30B 15/14; G05D 19/02; H02P 23/18; H02P 31/00
See application file for complete search history.

(56) References Cited

U.S. PATENT DOCUMENTS 7,360,391 B2 * 4/2008 Iwashita ................ B21D 24/02
                                                         72/14.8
7,406,851 B2    8/2008 Shiroza et al.
7,659,681 B2    2/2010 Onishi et al.
9,707,612 B2 *  7/2017 Kohno .................... B30B 15/14
(Continued)

FOREIGN PATENT DOCUMENTS

CN       101122789 A    2/2008
CN       101533272 A    9/2009
(Continued)

*Primary Examiner* — Zhipeng Wang
(74) *Attorney, Agent, or Firm* — RatnerPrestia (57) ABSTRACT

A servomotor control device in a processing machine that processes an object to be processed on a press supporting unit driven by a servomotor includes: a pressure detection unit configured to detect an actual pressure applied on the object to be processed; a pressure command generation unit configured to generate a pressure command that commands a pressure that the object to be processed preferably receives; a pressure control unit configured to generate a speed command for the servomotor on the basis of the pressure command generated by the pressure command generation unit and the actual pressure detected by the pressure detection unit; and a speed command limiting unit configured to limit the speed command generated by the pressure control unit using a predetermined value.

7 Claims, 4 Drawing Sheets

(56) References Cited

U.S. PATENT DOCUMENTS

| | | | |
|---|---|---|---|
| 2006/0107724 A1* | 5/2006 | Iwashita | B21D 24/02 72/351 |
| 2007/0084264 A1* | 4/2007 | Iwashita | G05B 19/19 72/350 |
| 2009/0230910 A1 | 9/2009 | Hishikawa et al. | |
| 2014/0084838 A1* | 3/2014 | Horiguchi | H02P 31/00 318/560 |
| 2016/0041533 A1* | 2/2016 | Ueda | G05B 19/19 700/280 |

FOREIGN PATENT DOCUMENTS

| | | |
|---|---|---|
| DE | 102014226634 B3 | 5/2016 |
| JP | S53115477 U | 9/1978 |
| JP | S63002534 U | 1/1988 |
| JP | 2006026738 A | 2/2006 |
| JP | 4015139 B2 | 11/2007 |
| JP | 4357405 B2 | 11/2009 |
| JP | 2014151361 A | 8/2014 |

* cited by examiner

SERVOMOTOR CONTROL DEVICE IN PROCESSING MACHINE

CROSS-REFERENCE TO RELATED APPLICATION

This application is a new U.S. Patent Application that claims benefit of Japanese Patent Application No. 2017-246725, filed Dec. 22, 2017, the disclosure of this application is being incorporated herein by reference in its entirety for all purposes.

BACKGROUND OF THE INVENTION

1. Field of the Invention

The present invention relates to a servomotor control device in a processing machine.

2. Description of the Related Art

There exist processing machines that process an object to be processed by applying pressure from both sides of the object to be processed. For example, riveting machines move a riveting head toward a supporting unit that supports an object to be processed and drive a rivet, which is the object to be processed, into a workpiece by crashing the riveting head into the rivet. Such riveting machines perform a position control for positioning the riveting head before the riveting head comes into contact with the rivet and after the riveting head moves away from the rivet and perform a pressure control while the riveting head is in contact with the rivet.

There are some rivet supporting tables that follow movement of the riveting head after the riveting head comes into contact with the rivet and pressing the rivet is started until the pressing is finished and the riveting head moves away from the rivet. For such supporting tables, to improve efficiency in riveting, it is required to steadily apply a certain amount of pressure on the object to be processed while a surface of the supporting unit follows the riveting head. In recent years, to achieve a pressure control superior in responsiveness, supporting units employing a servomotor as a drive source have been also used. For such supporting units employing a servomotor as the drive source, when the riveting head applies a colliding force to the rivet, a control method of the servomotor for driving the supporting table is switched from a position control to a pressure control to properly adjust a force applied by the riveting head to the rivet. In addition, when the riveting head moves away from the rivet, the control method of the servomotor for driving the supporting table is further switched from the pressure control to the position control to cause the supporting unit to quickly return to a standby position.

For example, as described in Japanese Patent No. 4015139, there are known servomotor control devices for forming machines that perform a die cushion operation by reciprocating one of die fastening members by a predetermined stroke and driving the other of the die fastening members by a servomotor, which forming machines include a detector for detecting a position of the die fastening member or a position of the servomotor that drives the die fastening member, a detector for detecting a speed of the servomotor, a position control processing unit for generating a speed command from a position error, which is a difference between a position command and a position feedback value, and a speed control processing unit for generating a torque command from a speed error, which is a difference between the speed command and a speed feedback value, and process an object to be processed by driving the servomotor according to the torque command, the servomotor control device for the forming machine including a detector for detecting an actual pressure applied on the object to be processed, a pressure control processing unit for generating a speed command from a pressure error, which is a difference between a pressure command and the actual pressure, a comparison means that compares the speed command output by the position control processing unit with the speed command output by the pressure control processing unit, selects the one having a value for applying the smaller pressure in the direction of pressing the object to be processed as an actual speed command, and passes it to the speed control processing unit, and a feedforward means that adds a feedforward control value based on a differential value of the position command to the selected speed command when the speed command output by the pressure control command unit is selected.

In addition, for example, as described in Japanese Patent No. 4357405, there are known servomotor control devices, including: a force detecting means for detecting a force that a driven body driven by a servomotor receives from outside; a position command generating means for generating a position command that commands a position of the driven body; a position detecting means for detecting the position of the driven body; a force command generating means for generating a force command that commands a force that the driven body preferably receives; a position control processing means for generating a motor operation command on the basis of a position error calculated from the position command generated by the position command generating means and the position detected by the position detecting means; a force control processing means for generating a motor operation command on the basis of a force error calculated from the force command generated by the force command generating means and the force detected by the force detecting means; and a control method selecting means for selectively switching between a position control, in which an operation of the servomotor is controlled in accordance with the motor operation command by the position control processing means by comparing the motor operation command generated by the position control processing means with the motor operation command generated by the force control processing means, and a force control, in which the operation of the servomotor is controlled in accordance with the motor operation command by the force control processing means, wherein the servomotor control device controls the operation of the servomotor such that the driven body receives a predetermined force when a force is applied to the driven body from outside, the servomotor control device further including, in order to move forward a timing at which the control method selecting means switches from the position control to the force control, a command correcting means for correcting the force command generated by the force command generating means or the position command generated by the position command generating means and transmitting the corrected command to the force control processing means or the position control processing means, wherein the command correcting means corrects the force command generated by the force command generating means to a smaller value while the control method selecting means is selecting the position control.

SUMMARY OF INVENTION

It has been desired, when a supporting unit employing a servomotor as a drive source is used in a riveting machine, which is a processing machine that performs a position control in positioning before a riveting head comes into contact with an object to be processed and after the riveting head moves away from the object to be processed and that performs a pressure control while the riveting head is in contact with the object to be processed, to achieve a servomotor control device that controls the servomotor for driving the supporting unit, which enables an efficient riveting by steadily pressing the object to be processed during the pressure control to prevent pressure from being lost and by preventing the object to be processed from following movement of the riveting head when pressing is finished and the riveting head is moved away from the object to be processed.

In one aspect of the present disclosure, a servomotor control device in a processing machine, which applies pressure on an object to be processed on a press supporting unit driven by a second servomotor with a press working unit driven by a first servomotor to process the object to be processed, includes: a first position detection unit configured to detect an actual position of the first servomotor; a first position command generation unit configured to generate a position command for the first servomotor; a first position control unit configured to generate a speed command for the first servomotor on the basis of the position command generated by the first position command generation unit and the actual position detected by the first position detection unit; a pressure detection unit configured to detect an actual pressure applied by the press working unit and the press supporting unit on the object to be processed; a pressure command generation unit configured to generate a pressure command that commands a pressure that the object to be processed preferably receives; a pressure control unit configured to generate a speed command for the second servomotor on the basis of the pressure command generated by the pressure command generation unit and the actual pressure detected by the pressure detection unit; and a speed command limiting unit configured to limit the speed command generated by the pressure control unit using a predetermined value.

BRIEF DESCRIPTION OF DRAWINGS

The present invention will be more clearly understood with reference to the following accompanying drawings.

DETAILED DESCRIPTION

A servomotor control device in a processing machine that processes an object to be processed on a press supporting unit with a press working unit will be described below with reference to drawings. In each drawing, similar members are denoted by similar reference numerals. To facilitate understanding, these drawings use different scales as appropriate. An embodiment illustrated in the drawings is an example for implementing the present disclosure, and the present disclosure is not limited to the illustrated embodiment.

Figure 1:
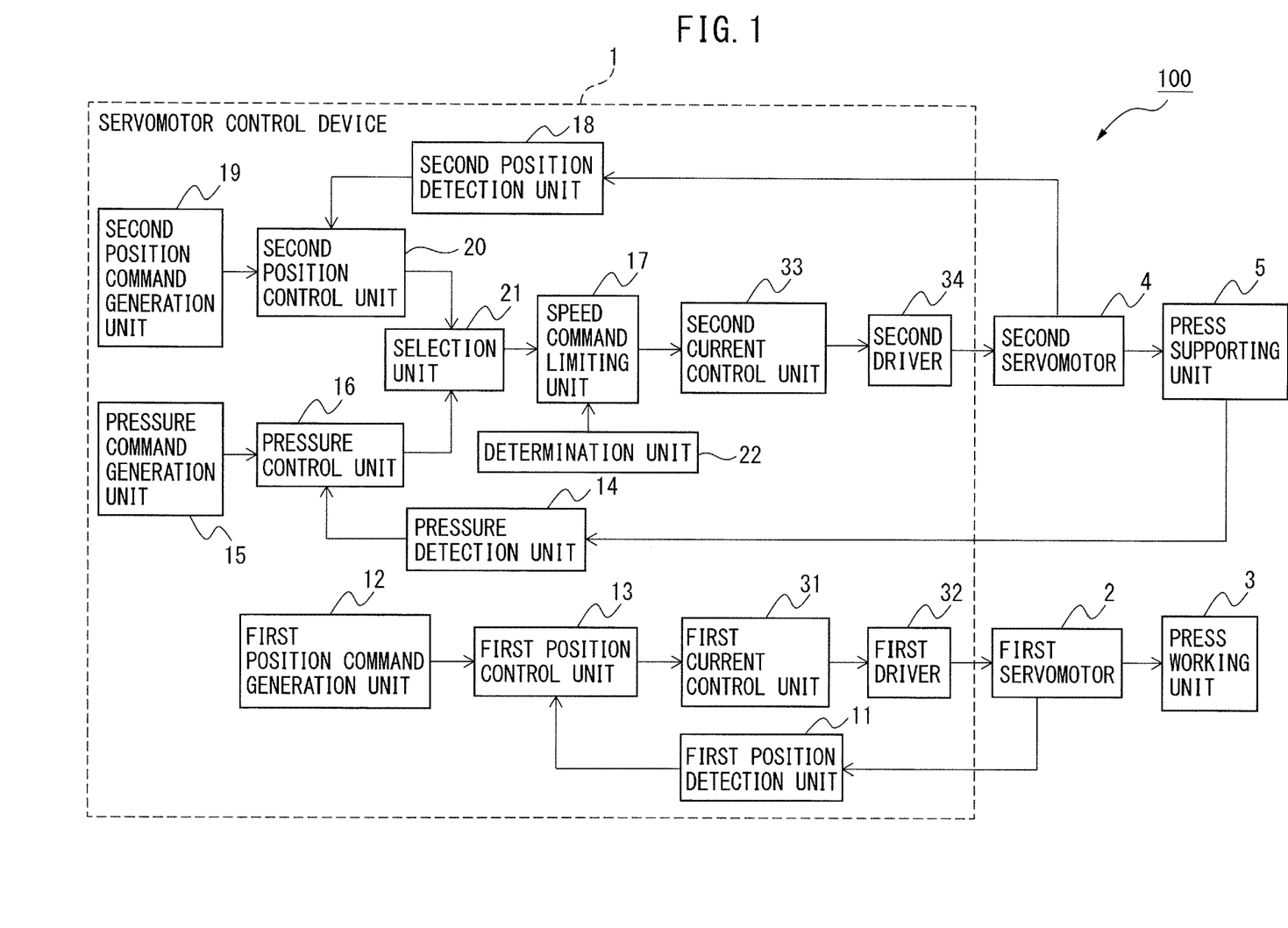
FIG. 1 is a block diagram of a motor controller according to one embodiment.
Figure 2:
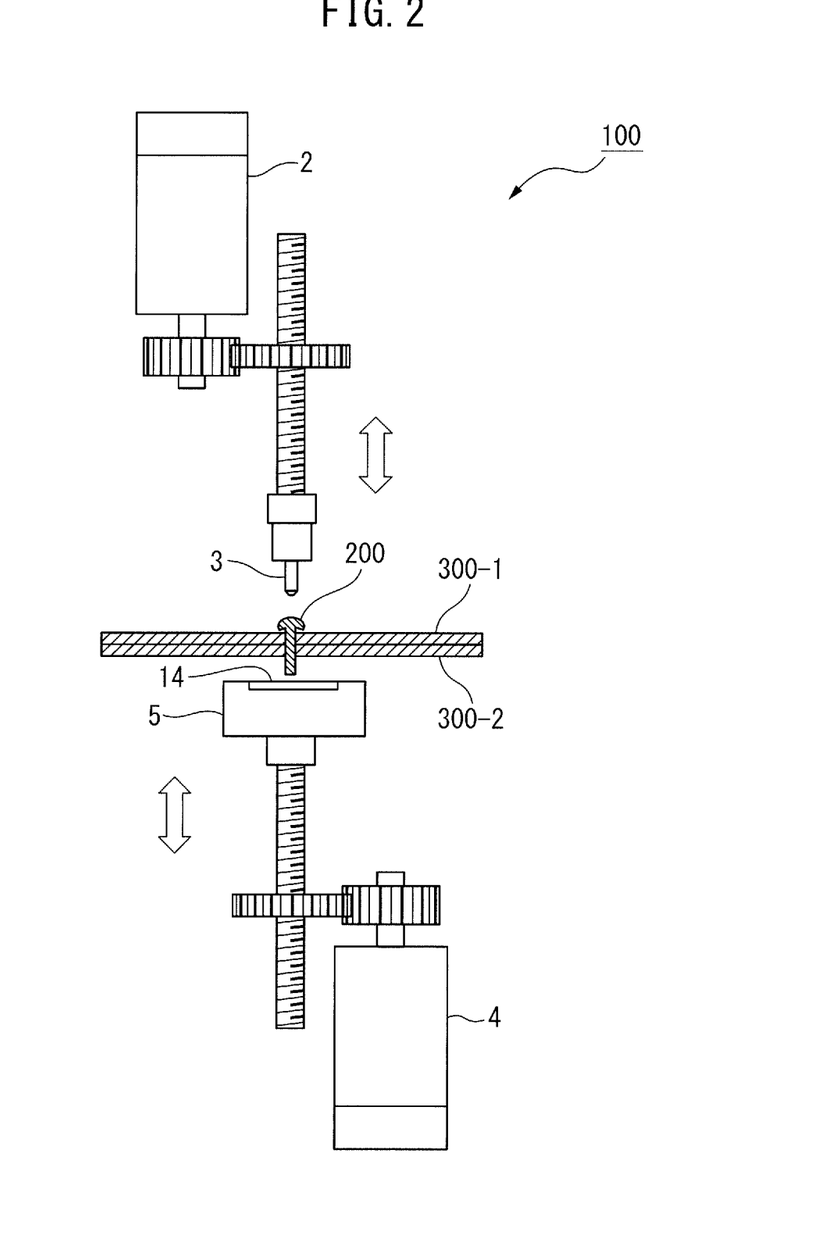
FIG. 2 is a schematic diagram illustrating a press working unit and a press supporting unit in a processing machine to which the servomotor control device illustrated in FIG. 1 is applied.

FIG. 1 is a block diagram of a motor controller according to one embodiment. FIG. 2 is a schematic diagram illustrating a press working unit and a press supporting unit in a processing machine to which the servomotor control device illustrated in FIG. 1 is applied.

In a riveting machine, which is a processing machine 100 that applies pressure on an object to be processed on a press supporting unit 5 driven by a second servomotor 4 with a press working unit 3 driven by a first servomotor 2 to process the object to be processed, a servomotor control device 1 according to one aspect of the present disclosure controls the first servomotor 2 and the second servomotor 4. In the riveting machine being the processing machine 100, workpieces 300-1 and 300-2, into which a rivet 200 being the object to be processed is driven by the press working unit 3 being a riveting head, are placed on the press supporting unit 5. Driving the rivet 200 by means of riveting couples the workpiece 300-1 with the workpiece 300-2. The press supporting unit 5 has a functionality of holding the object to be processed between the press supporting unit 5 and the press working unit 3 while the press supporting unit 5 contacts with the press working unit 3 via the rivet 200 when the press working unit 3 comes into contact with the rivet 200 and applies a predetermined force toward the press working unit 3 to the rivet 200.

The press working unit 3 is connected with a shaft of the first servomotor 2 by means of, for example, a belt/pulley mechanism and a ball screw mechanism, and by converting rotation of the first servomotor 2 into linear movement by means of the belt/pulley mechanism and the ball screw mechanism, the press working unit 3 can move up and down. As an alternative example for this, the press working unit 3 may be connected with the first servomotor 2 by means of, for example, a gear, or, for example, directly coupled with the first servomotor 2.

The press supporting unit 5 is connected with a shaft of the second servomotor 4 by means of, for example, a belt/pulley mechanism and a ball screw mechanism, and by converting rotation of the second servomotor 4 into linear movement by means of the belt/pulley mechanism and the ball screw mechanism, the press supporting unit 5 can move up and down. As an alternative example for this, the press supporting unit 5 may be connected with the second servomotor 4 by means of, for example, a gear, or, for example, directly coupled with the second servomotor 4.

The servomotor control device 1 performs a position control on the press working unit 3. In other words, the servomotor control device 1 controls a position of the press working unit 3 by controlling the first servomotor 2. The press working unit 3 is driven by the first servomotor 2 to approach and move away from the press supporting unit 5 by a predetermined operation, and drives the rivet 200, which is the object to be processed, into the workpieces 300-1 and 300-2 held between the press working unit 3 and the press supporting unit 5 to perform riveting.

In addition, the servomotor control device 1 performs a position control on the press supporting unit 5 to cause the press supporting unit 5 to quickly return to a standby position before the press working unit 3 comes into contact with the object to be processed and after the press working unit 3 moves away from the object to be processed, and performs a pressure control on the press supporting unit 5 to optimally control pressure applied by the press working unit 3 on the object to be processed while the press working unit 3 is in contact with the object to be processed.

The servomotor control device 1 according to one aspect of the present disclosure, which performs the aforementioned operation, includes a first position detection unit 11, a first position command generation unit 12, a first position control unit 13, a first current control unit 31, and a first driver 32 to control the first servomotor 2 for driving the press working unit 3. The servomotor control device 1 also includes a pressure detection unit 14, a pressure command generation unit 15, a pressure control unit 16, a speed command limiting unit 17, a second position detection unit 18, a second position command generation unit 19, a second position control unit 20, a selection unit 21, and a determination unit 22 to control the second servomotor 4 for driving the press supporting unit 5.

First, a mechanism of controlling the first servomotor 2 for driving the press working unit 3 will be described.

The first position detection unit 11 detects an actual position of the first servomotor 2. The first position detection unit 11 is attached to the first servomotor 2, and since the first servomotor 2 is connected with the press working unit 3 by means of, for example, a belt/pulley mechanism and a ball screw mechanism, the actual position of the first servomotor 2 to be detected by the first position detection unit 11 corresponds to an actual position of the press working unit 3. As the first position detection unit 11 as described above, an encoder or the like is typically used. As an alternative example for this, the actual position of the press working unit 3 may be detected by a linear scale attached to the press working unit 3 and may be converted into the actual position of the first servomotor 2 and used.

The first position command generation unit 12 generates a position command for the first servomotor 2. Note that, when the first position detection unit 11 is implemented using a linear scale for detecting the actual position of the press working unit 3, the first position command generation unit 12 may generate a position command for the press working unit 3; in this case, a process of converting the actual position of the press working unit 3 detected by the linear scale into the actual position of the first servomotor 2 may be omitted.

The first position control unit 13 generates a speed command for the first servomotor 2 on the basis of the position command generated by the first position command generation unit 12 and the actual position detected by the first position detection unit 11.

The first current control unit 31 generates a current command on the basis of the speed command generated by the first position control unit 13 and outputs the current command to the first driver (drive circuit) 32.

The first driver 32 consists of, for example, an inverter and a control circuit thereof, and the like, and supplies drive power to the first servomotor 2 in accordance with the current command received from the first current control unit 31 such that the first servomotor 2 performs a desired operation.

Next, a mechanism of controlling the second servomotor 4 for driving the press supporting unit 5 will be described.

The pressure detection unit 14 detects an actual pressure applied on the rivet 200 on the press supporting unit 5. The pressure detection unit 14 is attached at, for example, a portion of the press supporting unit 5 where the rivet 200 touches when pressed by the press working unit 3, and is configured to detect the actual pressure applied on the press supporting unit 5 (i.e., a counteracting force of a force that the press supporting unit 5 exerts on the press working unit 3). As the pressure detection unit 14 as described above, a pressure sensor or the like is typically used. As an alternative example for this, the pressure detection unit 14 may be attached at, for example, a portion of the press working unit 3 where the rivet 200 touches when the press working unit 3 presses the rivet 200; the actual pressure applied on the press working unit 3 detected in this case is, similarly to the case where the pressure detection unit 14 is attached to the press supporting unit 5, a counteracting force of a force that the press supporting unit 5 exerts on the press working unit 3.

The pressure command generation unit 15 generates a pressure command that commands a pressure that the rivet 200 preferably receives.

The pressure control unit 16 generates a speed command for the second servomotor 4 on the basis of (a difference of) the pressure command generated by the pressure command generation unit 15 and the actual pressure detected by the pressure detection unit 14.

The second position detection unit 18 detects an actual position of the second servomotor 4. The second position detection unit 18 is attached to the second servomotor 4, and since the second servomotor 4 is connected with the press supporting unit 5 by means of, for example, a belt/pulley mechanism and a ball screw mechanism, the actual position of the second servomotor 4 detected by the second position detection unit 18 corresponds to an actual position of the press supporting unit 5. As the second position detection unit 18 as described above, an encoder or the like is typically used. As an alternative example for this, the actual position of the press supporting unit 5 may be detected by a linear scale attached to the press supporting unit 5 and may be converted into the actual position of the second servomotor 4 and used.

The second position command generation unit 19 generates a position command for the second servomotor 4. Note that, when the second position detection unit 19 is implemented using a linear scale for detecting the actual position of the press supporting unit 5, the second position command generation unit 19 may generate a position command for the press supporting unit 5; in this case, a process of converting the actual position of the press supporting unit 5 detected by the linear scale into the actual position of the second servomotor 4 may be omitted.

The second position control unit 20 generates a speed command for the second servomotor 4 on the basis of (a difference of) the position command generated by the second position command generation unit 19 and the actual position detected by the second position detection unit 18.

The selection unit 21 compares the speed command generated by the second position control unit 20 with the speed command generated by the pressure control unit 16, selects the one having the smaller command value (speed command) for a direction of applying pressure on the rivet 200, adopts the one as the final speed command, and inputs the speed command into the speed command limiting unit 17. It is defined here that, the greater the value of the speed command for a direction of moving away from the rivet 200, the smaller the value of the speed command for a direction of pressing the rivet 200. In other words, assuming that the speed command is positive in a direction of pressing the rivet 200, the value of the speed command for the direction of moving away from the rivet 200 becomes "smaller" as the press supporting unit 5 is farther from the rivet 200.

For example, when a positive direction for the position command generated by the second position command generation unit 19 and a direction in which the press supporting unit 5 applies a pressure on the rivet 200 are the same, the selection unit 21 compares the speed command generated by the second position control unit 20 with the speed command generated by the pressure control unit 16, selects the one closer to negative infinity, and adopt the one as the final speed command. For example, when the positive direction for the position command generated by the second position command generation unit 19 and the direction in which the press supporting unit 5 applies a pressure on the rivet 200 are opposite, the selection unit 21 inverts the sign of the speed command generated by the pressure control unit 16, compares the resultant value with the speed command generated by the second position control unit 20, selects the one closer to positive infinity, and adopt the one as the final speed command.

The speed command limiting unit 17 limits the speed command generated by the pressure control unit 16 using a predetermined value. In other words, when the selection unit 21 selects the speed command generated by the pressure control unit 16, the speed command limiting unit 17 limits the selected speed command generated by the pressure control unit 16 using the predetermined value. An operation of the speed command limiting unit 17 will be described in more detail as follows.

Figure 3A:
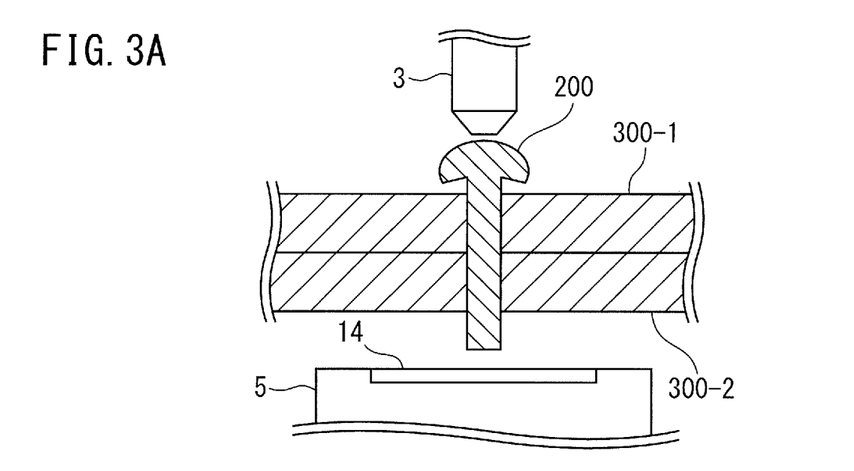
FIG. 3A is a schematic diagram illustrating riveting in a riveting machine and illustrates a state in which the press working unit is moving toward a rivet before pressing.
Figure 3B:
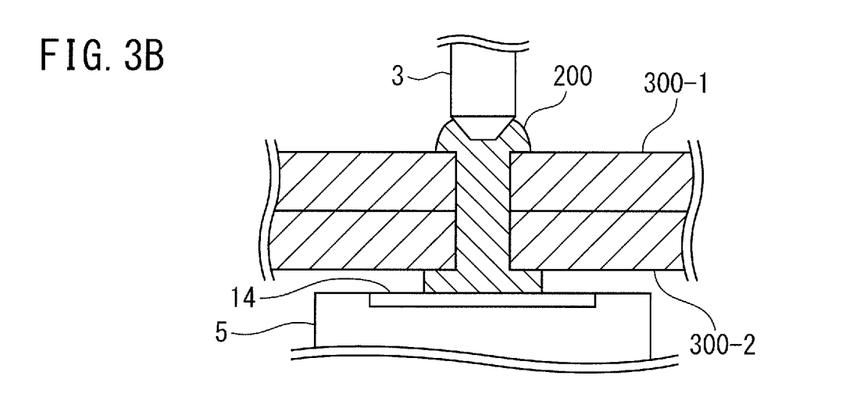
FIG. 3B is a schematic diagram illustrating riveting in the riveting machine and illustrates a state in which the press working unit is pressing a rivet.
Figure 3C:
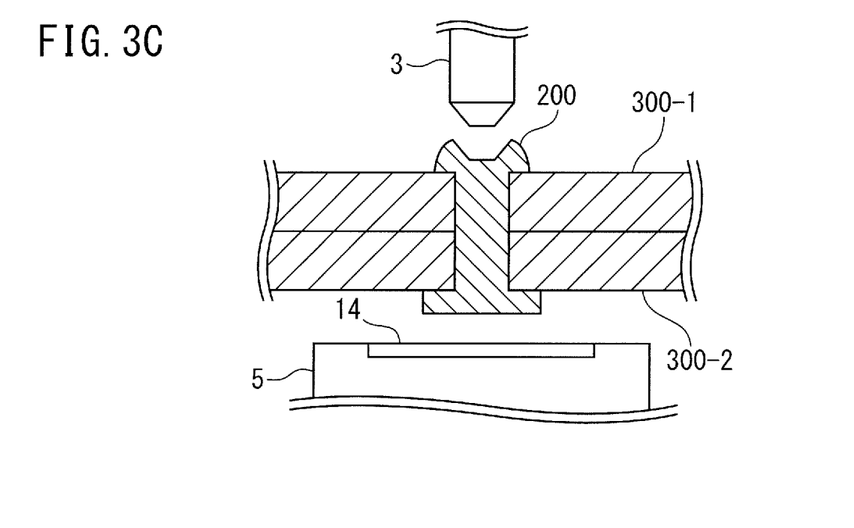
FIG. 3C is a schematic diagram illustrating riveting in the riveting machine and illustrates a state in which the press working unit is moving away from the rivet after pressing.

FIG. 3A is a schematic diagram illustrating riveting in a riveting machine and illustrates a state in which the press working unit is moving toward a rivet before pressing. FIG. 3B is a schematic diagram illustrating riveting in the riveting machine and illustrates a state in which the press working unit is pressing a rivet. FIG. 3C is a schematic diagram illustrating riveting in the riveting machine and illustrates a state in which the press working unit is moving away from the rivet after pressing. In riveting by the riveting machine, which is the processing machine 100, for example, two workpieces 300-1 and 300-2 are placed on the press supporting unit 5, and the rivet 200, which is the object to be processed, is driven by the press working unit 3. Riveting shrinks the rivet 200, and never extends the rivet 200. Driving the rivet 200 by means of riveting couples the workpiece 300-1 with the workpiece 300-2. The number of the workpieces to be coupled by means of a rivet was assumed here to be two as an example, but it may be three or more.

As illustrated in FIG. 3A, before pressing and in a state in which the press working unit 3 is not in contact with a rivet, while the press working unit 3 is positionally controlled by the motor controller 1 to move toward the rivet 200, the press supporting unit 5 is positionally controlled such that the press supporting unit 5 is positioned at a standby position.

As illustrated in FIG. 3B, when a pressure is applied on the rivet 200 placed on the press supporting unit 5 by the press working unit 3 from one side of the rivet 200, to prevent the pressure applied on the rivet 200 in riveting from being decreased, the rivet 200 to be pressed by the press working unit 3 is preferably pressed in a direction in which the press supporting unit 5 supports the rivet 200 (the direction in which the press supporting unit 5 moves toward the rivet 200 in FIG. 3B). In other words, it means that, to keep a proper pressure applied on the rivet 200, the press supporting unit 5 does not preferably move away from the rivet 200. As described above, since the servomotor control device 1 performs the pressure control on the press supporting unit 5 while the press working unit 3 presses the rivet 200 and performs riveting (FIG. 3B), the speed command limiting unit 17 limits the speed command generated by the pressure control unit 16 using a predetermined value, for example, to approximately zero, and prevents a speed command that instructs moving away from the rivet 200 from being input into the second current control unit 33. In this manner, as illustrated in FIG. 3B, when the press working unit 3 drives the rivet 200, the press supporting unit 5 holds on to the rivet 200; as illustrated in FIG. 3C, when the press working unit 3 moves away from the rivet 200, the press supporting unit 5 does not follow movement of the press working unit 3 and remains at the position.

For example, when a material of the rivet 200 is particularly hard, riveting may be performed by striking and driving the rivet 200 while swinging the press working unit 3. In this case, if the servomotor control device 1 performs the pressure control on the press supporting unit 5 in synchronization with swinging of the press working unit 3 without any change, the actual pressure detected by the pressure detection unit 14 becomes smaller because the press working unit 3 moves in a direction away from the rivet 200. Because of this, a difference between the pressure command generated by the pressure command generation unit 15 and the actual pressure detected by the pressure detection unit 14 becomes large; consequently, the pressure control unit 16 outputs a speed command having a greater value. As a result, the press supporting unit 5 moves in a direction in which the press working unit 3 moves away from the rivet 200 at a faster speed; consequently, the press working unit 3 does not move away from the rivet 200 and the press working unit 3 cannot strike the rivet 200. Accordingly, the speed command limiting unit 17 limits the speed command generated by the pressure control unit 16 such that the value of the speed command is equal to or greater than a predetermined value to directionally restrict a moving direction of the press supporting unit 5 that applies a pressure on the rivet 200 (in other words, supports the rivet 200). If the aforementioned predetermined value is set to approximately zero, the press supporting unit 5 does not follow the movement of the press working unit 3 and remains at the position when the press working unit 3 moves away from the rivet 200; consequently, the press working unit 3 can strike the rivet 200. Furthermore, for example, by setting the predetermined value to the value of the speed command for the press working unit 3 and the speed command limiting unit 17 limiting the speed command generated by the pressure control unit 16 such that the value of the speed command generated by the pressure control unit 16 is equal to or greater than the aforementioned predetermined value, the speed command limiting unit 17 directionally restricts the moving direction of the press supporting unit 5 that applies a pressure on the rivet 200 (in other words, supports the rivet 200). If the aforementioned predetermined value is set to the value of the speed command for the press working unit 3, the press supporting unit 5 will move more slowly than the movement of the press working unit 3 when the press working unit 3 moves away from the rivet 200; consequently, a distance between the press working unit 3 and the press supporting unit 5 will become wider; thus, the press working unit 3 can strike the rivet 200 by swinging.

In this manner, when the selection unit 18 selects the speed command generated by the pressure control unit 16, the speed command limiting unit 17 limits the selected speed command generated by the pressure control unit 16 using the predetermined value.

The determination unit 22 determines whether to limit the speed command generated by the pressure control unit 16 by means of the speed command limiting unit 17. When the determination unit 22 determines to perform limitation, the speed command limiting unit 17 limits the speed command generated by the pressure control unit 16 using the predetermined value.

For example, when the riveting machine, which is the processing machine 100, operates in accordance with a predefined program relating to riveting, a timing at which the press working unit 3 presses the rivet 200, i.e., a timing at which a required pressure is applied on the object to be processed between the press working unit 3 and the press supporting unit 5 is predefined in the program; therefore, in accordance with the program, at the timing at which the required pressure is applied on the rivet 200 between the press working unit 3 and the press supporting unit 5, the determination unit 22 determines to limit the speed command generated by the pressure control unit 16 by means of the speed command limiting unit 17.

Furthermore, for example, the determination unit 22 may determine, upon receiving a limit command, to limit the speed command generated by the pressure control unit 16. For example, when the pressure detection unit 14 detects that the rivet 200 is pressed, for example, the pressure detection unit 14 may be configured to output a limit command to the determination unit 22, and upon receiving the limit command, the determination unit 22 responds by limiting the speed command generated by the pressure control unit 16. For example, in a case of riveting a predetermined member during manufacturing an aircraft or the like, when no particular program relating to riveting is defined for the riveting machine, which is the processing machine 100, the pressure detection unit 14 may be configured to detect that the riveting machine is in contact with the member of the aircraft, which in turn may cause the pressure detection unit 14 to output a limit command to the determination unit 22; in response to the limit command, the determination unit 22 may determine to limit the speed command generated by the pressure control unit 16.

Whether the speed command limiting unit 17 has limited the speed, the second current control unit 33 generates a current command on the basis of the speed command received from the speed command limiting unit 17 and outputs the current command to the second driver (drive circuit) 24.

The second driver 34 consists of, for example, an inverter and a control circuit thereof, and the like, and supplies drive power to the second servomotor 4 in accordance with the current command received from the second current control unit 33 such that the second servomotor 4 performs a desired operation.

The first position command generation unit 12, the first position control unit 13, the first current control unit 31, the pressure command generation unit 15, the pressure control unit 16, the speed command limiting unit 17, the second position command generation unit 19, the second position control unit 20, the selection unit 21, the determination unit 22, and the second current control unit 33, all of which have been described above, may be implemented, for example, in the form of a software program or by a combination of a variety of electronic circuits and a software program. In the aforementioned embodiment, for example, the first position command generation unit 12, the first position control unit 13, the first current control unit 31, the pressure command generation unit 15, the pressure control unit 16, the speed command limiting unit 17, the second position command generation unit 19, the second position control unit 20, the selection unit 21, the determination unit 22, and the second current control unit 33 are implemented in the form of a software program, and individual functionalities of the respective units are achieved by causing an arithmetic processing device such as a computer to execute the software program.

Figure 4:
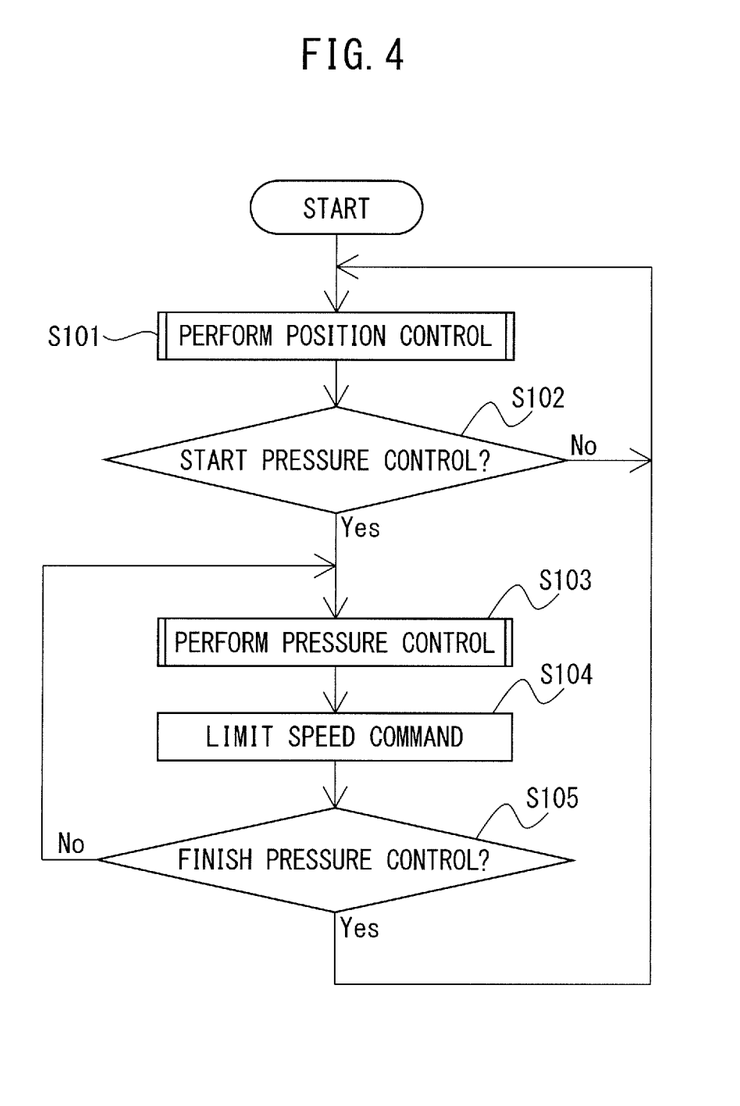
FIG. 4 is a flowchart illustrating an operation sequence of the motor controller according to the one embodiment.

FIG. 4 is a flowchart illustrating an operation sequence of the motor controller according to one embodiment.

In the riveting machine, which is the processing machine 100, while the press working unit 3 is away from the press supporting unit 5 on which the rivet 200 is placed before pressing, the servomotor control device 1 performs the position control on the press supporting unit 5 such that the press supporting unit 5 is positioned at the standby position (step S101).

In step S102, the servomotor control device 1 determines whether to start the pressure control on the press supporting unit 5 in response to the press working unit 3 coming into contact with the rivet 200. When the press working unit 3 is not in contact with the rivet 200, the process returns to step S101, and the servomotor control device 1 performs the position control on the press supporting unit 5. When it is determined that the pressure control on the press supporting unit 5 is preferably to be started in response to the press working unit 3 coming into contact with the rivet 200, the process proceeds to step S103. Note that, in conjunction with the determination process in step S102, the determination unit 22 performs a process of determining whether to limit the speed command generated by the pressure control unit 16. Therefore, when the process proceeds to step S103, the determination unit 22 has determined to limit the speed command generated by the pressure control unit 16.

In step S103, the servomotor control device 1 performs the pressure control on the press supporting unit 5.

When step S103 is executed, in step S104, the speed command limiting unit 17 limits the speed command generated by the pressure control unit 16 using a predetermined value.

In step S105, the servomotor control device 1 determines whether to finish the pressure control on the press supporting unit 5 in response to the press working unit 3 having moved away from the rivet 200. When the press working unit 3 is not in contact with the rivet 200 (i.e., when the press working unit 3 has moved away from the rivet 200), the process returns to step S101, and the servomotor control device 1 performs the position control on the press supporting unit 5. When it is determined that the pressure control on the press supporting unit 5 is preferably not to be finished because the press working unit 3 is in contact with the object to be processed, the process returns to step S103.

As described above, in the riveting machine, which is the processing machine 100, according to the servomotor control device 1, the speed command limiting unit 17 limits the speed command generated by the pressure control unit 16 using a predetermined value; when the press working unit 3, which is the riveting head, drives the rivet 200, which is the object to be processed, the press supporting unit 5 holds on to the rivet 200; when the press working unit 3 moves away from the rivet 200, the press supporting unit 5 does not follow the movement of the press working unit 3 and remains at the position; thus, the press working unit 3 can strike the rivet 200 and riveting may be efficiently performed.

According to one aspect of the present disclosure, in a processing machine that processes an object to be processed on a press supporting unit with a press working unit, it is possible to achieve a servomotor control device, which steadily applies a pressure on the object to be processed when a pressure control is performed, and which controls a servomotor, which is a drive source of the press supporting unit, such that the object to be processed does not follow movement of the press working unit when the press working unit is moved away from the object to be processed after application of the pressure is finished.

The invention claimed is:

1. A servomotor control device in a processing machine configured to process an object to be processed on a press support driven by a second servomotor by applying pressure by means of a press driven by a first servomotor, comprising:
   a first position sensor configured to detect an actual position of the first servomotor;
   a pressure sensor configured to detect an actual pressure applied by the press to the object to be processed; and
   a processor configured to:
   generate a position command for controlling the first servomotor;
   generate a speed command for controlling the first servomotor, based on the position command generated and the actual position detected;
   generate a pressure command to control a pressure applied by the press to the object to be processed;
   generate a speed command for controlling the second servomotor, based on the pressure command generated and the actual pressure detected; and
   limit the speed command generated for controlling the second servomotor using a predetermined value.

2. The servomotor control device according to claim 1, comprising:
   a second position sensor configured to detect an actual position of the second; servomotor,
   wherein the processor is further configured to:
      generate a position command for the second; servomotor,
      generate a speed command for the second servomotor, based on the position command generated for the second servomotor and the actual position detected by the second position sensor,
      compare the speed command generated for the second servomotor based on the position command generated for the second servomotor with the speed command generated for the first servomotor and select the one having the smaller value, and
   limit the speed command generated for the second servomotor based on the position command generated for the second servomotor and selected using the predetermined value.

3. The servomotor control device according to claim 1, wherein the processor is further configured to directionally restrict a moving direction of the press support that supports the object to be processed by limiting the speed command for the second servomotor such that the value of the speed command generated for the second servomotor is equal to or greater than the predetermined value.

4. The servomotor control device according to claim 1, wherein the predetermined value is approximately zero.

5. The servomotor control device according to claim 1, wherein the processor is further configured to:
   determine whether to limit the speed command generated for the second servomotor, and
   when the processor determines to limit the speed command, the processor limits the speed command generated for the second servomotor by using the predetermined value.

6. The servomotor control device according to claim 5, wherein the processor is further configured to limit the speed command generated for the second servomotor when the object to be processed on which a pressure is applied by the press is supported by the press support.

7. The servomotor control device according to claim 5, wherein the processor is further configured to determine, upon receiving a limit command, to limit the speed command generated for the second servomotor.

* * * * *